W. E. CONNERTON.
BEVEL GEAR PULLER.
APPLICATION FILED MAR. 3, 1916.
1,227,583.
Patented May 29, 1917.
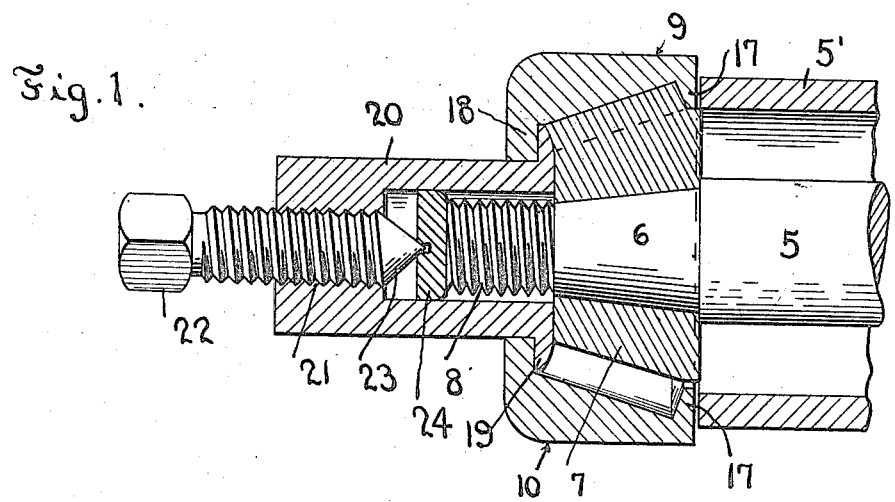
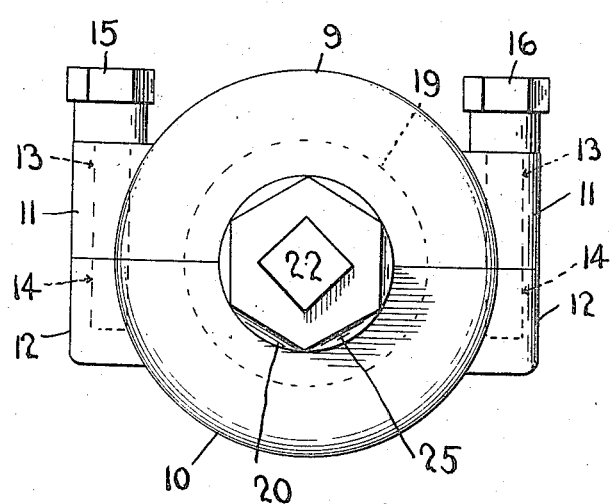
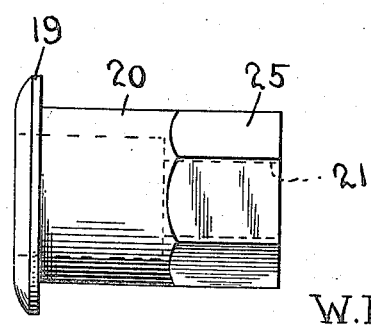
Witness
Geo. B. James
S. Friedman
Inventor
W. E. Connerton
By Perry H. Pattison
Attorney

UNITED STATES PATENT OFFICE.

WILLIAM E. CONNERTON, OF FALL RIVER, MASSACHUSETTS.

BEVEL-GEAR PULLER.

1,227,583.                    Specification of Letters Patent.    Patented May 29, 1917.

Application filed March 3, 1916. Serial No. 81,881.

*To all whom it may concern:*

Be it known that I, WILLIAM E. CONNERTON, a citizen of the United States, residing at Fall River, in the county of Bristol and State of Massachusetts, have invented certain new and useful Improvements in Bevel-Gear Pullers, of which the following is a specification.

This invention relates to improvements in devices for removing gears or similar devices from shafts, and has for its object, to construct a device of this kind that will exert a drawing action to the gear to which it is applied, longitudinally of the shaft on which the same is mounted.

Another object of my invention is to provide a device of this kind, that will completely house the gear to be removed, whereby all possibility of any lateral pressure during the removing of the gear which would result in the bending or distortion of the shaft to which the gear is applied, is positively prevented.

A still further object is to provide a device of this kind having a plurality of parts whereby the same will occupy comparatively small space when not in use, but when the elements are assembled the parts will be securely held together by their frictional contact.

Referring to the drawings, Figure 1 illustrates a horizontal sectional view of my device applied to a gear wheel, Fig. 2 is an end view, Fig. 3 is a side elevation of the two piece housing, and Fig. 4 is a side view of the drawing elements.

In the drawings, the numeral 5 illustrates a shaft, housed by a suitable sleeve 5′, said shaft having a tapered portion 6 on which the beveled gear 7 provided with a correspondingly shaped tapered opening, is positioned, the end of said shaft terminating in a threaded portion 8 to receive the usual nut for wedging the beveled gear onto its shaft. The member which houses the gear to be removed, comprises two sections 9 and 10, each of which is provided with lateral bosses 11 and 12 having threaded openings 13 and 14, and it will be seen that when said sections 9 and 10 are brought together around a gear, the openings 13 and 14 aline to receive the threaded members 15 and 16 which when screwed hold the sections 9 and 10 into engagement with each other.

Each of the sections is provided with a semi-circular inwardly extending flange 17 adjacent one of its ends, said flange adapted to engage one end of the teeth of the beveled gear, while the opposite end of each respective section is provided with a similar flange 18 which forms a shoulder to be engaged by the annular flange 19 of the drawing member 20 which has a central bore extending from one of its ends and terminating substantially centrally thereof, said bore being for the purpose of forming a clearance for the threaded end 8 of the shaft 5.

Extending from the opposite end of said member 20 is a threaded opening 21 communicating with the central bore, said opening 21 adapted to accommodate the threaded bolt 22, which has a tapered end 23 engaging within a central recessed portion of the guard 24 said guard being preferably circular in form, and of the same diameter as the central bore, whereby the same is supported in alinement with the threaded bolt 22 at all times. The opposite surface of said guard engages the end of the shaft to which the device is applied, and thereby eliminates all possibility of the bolt being distorted by the pressure of the bolt 22 when the same is rotated for dislodging a beveled gear.

To insure a direct longitudinal movement of the drawing element 20, I provide the same with flat surfaces 25 which may be grasped by a wrench or similar tool for holding the same against rotation when the threaded bolt is being operated.

In describing the operation of my device, attention is directed to Fig. 1, which shows the same as applied to a gear, and it will be seen that by rotating the threaded bolt 22, to the right, pressure is exerted on one end of the shaft 5, and due to the threaded engagement between the threaded bolt 22 and drawing element the bolt and housing are moved in opposite directions with the result that the gear being removed is dislodged from its shaft.

I claim.

1. A gear removing device comprising a housing having a flange adjacent each end thereof, a drawing element having a flange coöperating with one of the flanges of the housing, said drawing element having a threaded opening and a central bore, a threaded bolt extending through said opening, and a guard member supported in the bore for engaging the end of said bolt.

2. In combination with a shaft and a gear supported thereon, a gear removing device comprising a sectional housing adapted to embrace said gear, a drawing element, a threaded bolt extending through the drawing element, a guard member adapted to be interposed between the bolt and one end of the shaft whereby rotary movement of the bolt exerts pressure on the shaft and moves the housing and gear longitudinally thereof, and means for holding the sections of the housing together.

In testimony whereof I affix my signature in the presence of two witnesses.

WILLIAM E. CONNERTON.

Witnesses:
   HENRY B. BORDEN,
   JOSEPH CONNERTON.